United States Patent [19]
Nemoto et al.

[11] Patent Number: 4,524,926
[45] Date of Patent: Jun. 25, 1985

[54] CASSETTE AND CASSETTE ADAPTER FOR USE THEREWITH

[75] Inventors: Tsuneo Nemoto; Kokichi Sugawara, both of Miyagi, Japan

[73] Assignee: Sony Corporation, Tokyo, Japan

[21] Appl. No.: 482,412

[22] Filed: Apr. 6, 1983

[30] Foreign Application Priority Data

Apr. 16, 1982 [JP] Japan .................. 57-55239[U]

[51] Int. Cl.$^3$ .................... G03B 1/04; G11B 15/32
[52] U.S. Cl. .................... 242/198; 360/132
[58] Field of Search .......... 242/192, 197–200, 242/55.19 A; 360/93, 94, 96.1, 96.3, 96.4, 132, 137

[56] References Cited

U.S. PATENT DOCUMENTS

| 3,536,277 | 10/1970 | Fukuda | 242/199 |
| 3,632,894 | 1/1972 | Bretschneider et al. | 360/94 |
| 3,758,048 | 9/1973 | Sugaya et al. | 242/192 |
| 3,869,099 | 3/1975 | Inaga | 242/199 |
| 3,950,787 | 4/1976 | Hosaka | 360/137 |
| 4,006,493 | 2/1977 | Gerry | 360/132 |
| 4,106,724 | 8/1978 | Higashida | 242/198 |
| 4,110,801 | 8/1978 | Lemelson | 360/96.3 |
| 4,185,307 | 1/1980 | Sato | 360/94 |
| 4,432,510 | 2/1984 | Ogata et al. | 242/200 |

FOREIGN PATENT DOCUMENTS 1450744 9/1976 United Kingdom .
2089317 6/1982 United Kingdom .

Primary Examiner—Leonard D. Christian
Attorney, Agent, or Firm—Lewis H. Eslinger; Alvin Sinderbrand

[57] ABSTRACT

A tape cassette for use with a cassette adapter in a video tape recorder (VTR) of the type including a reel driving device, includes a housing; a supply reel rotatably positioned within the housing; a take-up reel rotatably positioned about a fixed axis of rotation within the housing and including a lower flange having a periphery; and an engaging device formed by gear teeth on the periphery of the lower flange, or a first gear rotatably positioned about the fixed axis of rotation adjacent the lower flange and having a periphery and gear teeth formed on its periphery; the reel driving device including a rotatable second gear having gear teeth for engaging with the gear teeth of the engaging device through an opening in the housing to rotate the take-up reel, or a cassette adapter positioned within the apparatus for housing the cassette and having a drive gear with gear teeth for engaging with the gear teeth of the engaging device through the opening in the housing and a drive shaft for engaging with the drive gear to control the latter to rotate the take-up reel. The cassette also includes a lid pivotally mounted to the front of the housing and a lid lock device for preventing pivotal movement of the lid to its open position when the cassette is not positioned within the VTR.

2 Claims, 11 Drawing Figures

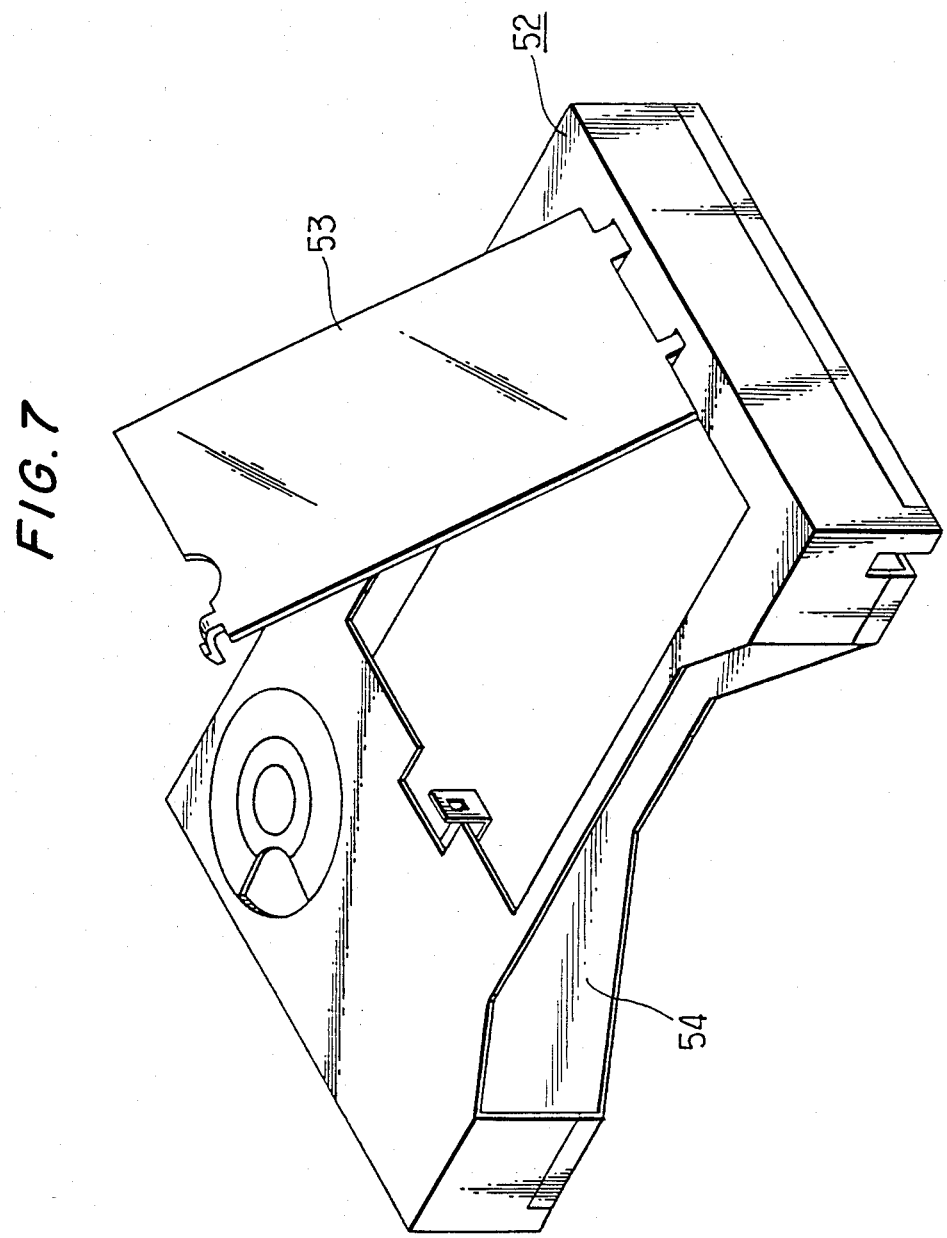

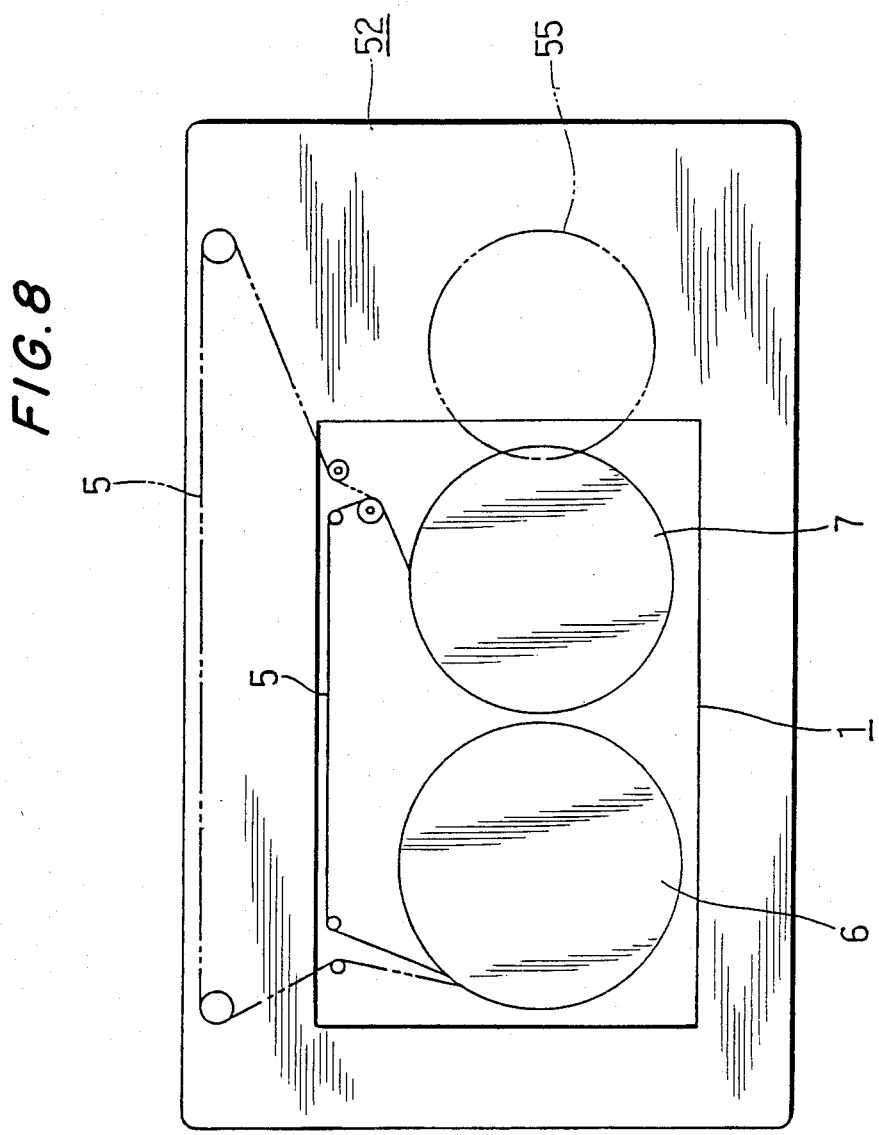

CASSETTE AND CASSETTE ADAPTER FOR USE THEREWITH

BACKGROUND OF THE INVENTION

This invention relates to tape cassettes and cassette adapters for use therewith and, more particularly, to a compact tape cassette loadable into a cassette adapter for use in an information signal recording and/or reproducing apparatus which normally uses a larger size cassette.

Small or "compact" video cassettes have recently been developed for use with portable video cameras and video tape recorders (VTR) to reduce both the size and weight thereof. With such compact video cassettes, magnetic tape is wound between a supply reel and a take-up reel, with the reels each being rotatably mounted while permitting slight transverse displacement thereof, as with conventional size cassettes, and thereby each readily permitting engagement with a respective spindle or drive shaft to drive and rotate the respective reel. The reels are normally locked from rotating when the compact cassette is not in use.

The compact cassette is smaller in size than a conventional video cassette, and thus cannot be readily and directly received in a video cassette recorder that uses conventionally sized video cassettes. In order to operate with compact cassettes in a conventional size video tape recorder, cassette adapters have also been developed which can be used therewith.

It is to be appreciated, however, that the drive shafts of the VTR are separated by a distance necessary to accommodate a conventional size cassette. Accordingly, the cassette adapter is configured so that the supply reel drive shaft of the VTR directly engages the supply reel of the compact cassette when the cassette adapter and compact cassette are positioned within the VTR, but that the take-up reel drive shaft of the VTR engages the take-up reel of the compact cassette through a gear train, for example, as disclosed in U.S. patent application Ser. No. 06/413,523, filed Aug. 31, 1982, having a common assignee herewith and the disclosure of which is incorporated herein by reference. As disclosed therein, the cassette adapter includes an impeller for rotatably engaging with the take-up reel of the compact cassette and a train of intermeshing gears for rotatably connecting the impeller to a hub which corresponds in position to the take-up reel of a conventional size cassette. In this manner, the take-up reel drive shaft engages with the hub to rotatably drive the take-up reel of the compact cassette through the aforementioned gear train.

However, as previously discussed, the take-up reel of the compact cassette is rotatably mounted while permitting slight transverse displacement thereof. It is to be appreciated that such transverse displacement in a conventional size cassette is desirable in order to enable easy engagement of the supply and take-up reel drive shafts with the respective reels. However, with a compact cassette driven by the aforementioned gear train arrangement, any slight transverse displacement of the take-up reel may result in inaccuracies in the drive of the take-up reel and in the tape tension on the run of tape extending between the supply and take-up reels. These inaccuracies are further increased if, for example, it is desired to reduce the number of gears by eliminating the impeller and driving the take-up reel by direct engagement of the take-up reel at the periphery thereof by the gear train. Additionally, in the latter case, actual disengagement between the take-up reel and gear train may result.

OBJECTS AND SUMMARY OF THE INVENTION

Accordingly, it is an object of the present invention to provide a compact cassette and a cassette adapter for use therewith that avoids the above-described difficulties encountered with the previously known arrangement.

More particularly, it is an object of the present invention to provide a compact cassette and cassette adapter which for use therewith which provides for accurate winding and unwinding of magnetic tape on the take-up reel of the compact cassette when the compact cassette and the cassette adapter are loaded into an information signal recording and/or reproducing apparatus.

In accordance with an aspect of this invention, a tape cassette for use with an information signal recording and/or reproducing apparatus having reel driving means, includes housing means; a supply reel rotatably positioned within said housing means; a take-up reel rotatably positioned about a fixed axis of rotation within said housing means; and engaging means mounted within said housing means for rotation with said take-up reel and engageable by said reel driving means for causing rotation of said take-up reel.

The above, and other, objects, features and advantages of the present invention will be apparent from the following detailed description of illustrative embodiments thereof, which is to be read in connection with the accompanying drawings.

BRIEF DESCRIPTION OF THE DRAWINGS

FIG. 7 is a perspective view of the shell of the cassette adapter of FIG. 6 having the lid thereof in an open position;

FIG. 8 is a schematic top plan view of the cassette adapter of FIG. 7 with the compact cassette according to the present invention positioned therein;

DETAILED DESCRIPTION OF THE PREFERRED EMBODIMENTS

Figure 1:
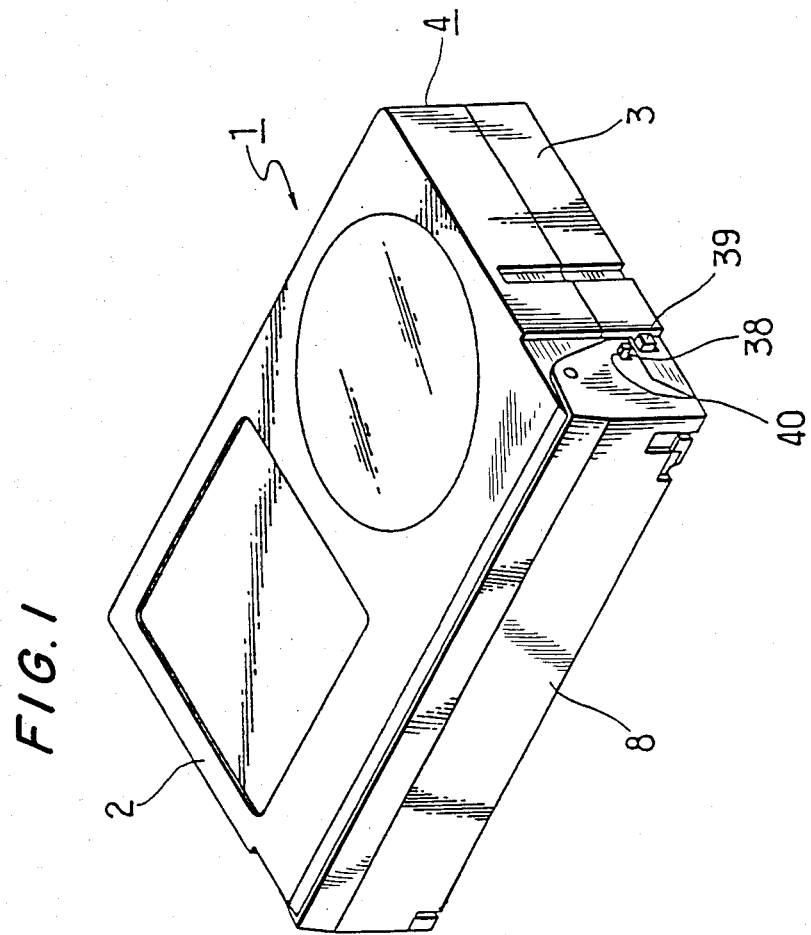
FIG. 1 is a perspective view, viewed from the top, of a compact cassette according to one embodiment of the present invention.

Referring to the drawings in detail, and initially to FIG. 1 thereof, a compact cassette 1 according to one embodiment of the present invention for use with a cassette adapter in an information signal recording and/or reproducing apparatus, includes an upper shell half 2 and a lower shell half 3, the combination of which forms a housing or casing 4. Disposed within casing 4, as shown in FIGS. 2 and 3, is a magnetic tape 5 which is wound about a supply reel 6, hereinafter referred to as an S reel, and a take-up reel 7, hereinafter referred to as a T reel, with guide pins or rollers 11, 12, 13 and 14 and plastic braces or springs 15 and 16 defining a run for the magnetic tape between the S and T reels and with the tape extending from the cassette between guide pins 11 and 12 through openings 9 and 10, respectively, at the front corners of the cassette.

Figure 2:
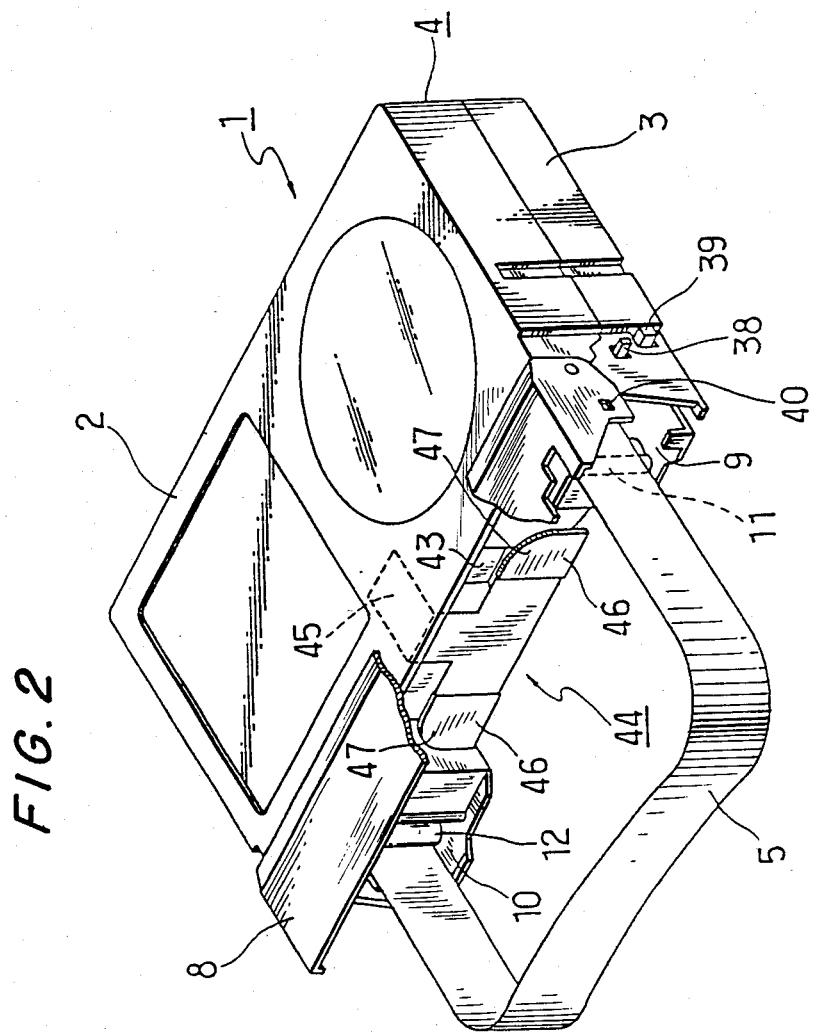
FIG. 2 is a perspective view, viewed from the top, of the compact cassette of FIG. 1 having a portion of the magnetic tape withdrawn therefrom.
Figure 4:
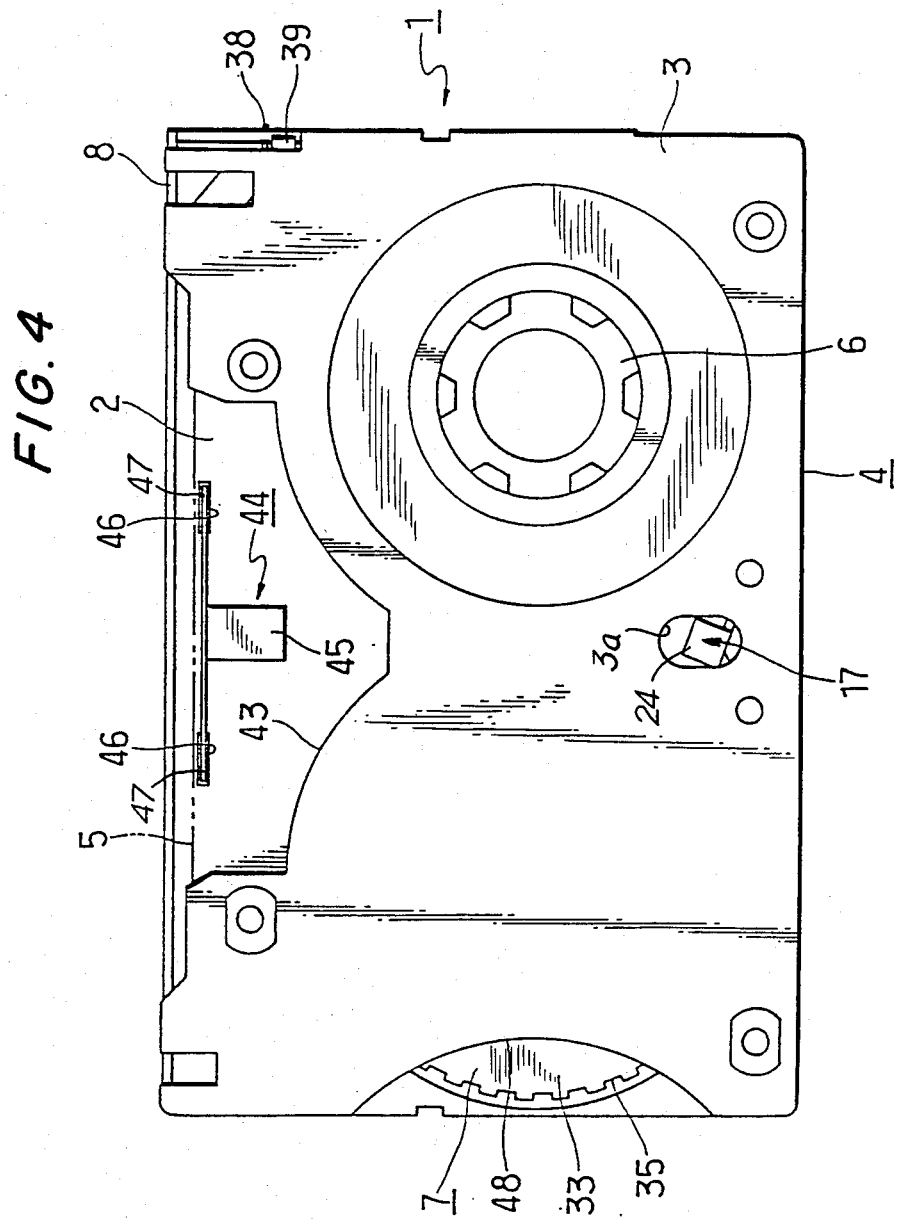
FIG. 4 is a bottom plan view of the compact cassette of FIG. 1.

As is also shown in FIGS. 2 and 4, in a cut-out area 43 at the front of casing 4, through which the run of magnetic tape 5 extends, casing 4 is also provided with an L-shaped tape support device 44. This device includes a fastening member 45 affixed to the upper shell half 2 and a downwardly extending section about which magnetic tape 5 is guided, the downwardly extending section including a flexible low friction film or surface 46 at both ends 47 thereof to minimize any wear to the magnetic tape as it passes thereover.

Figure 5:
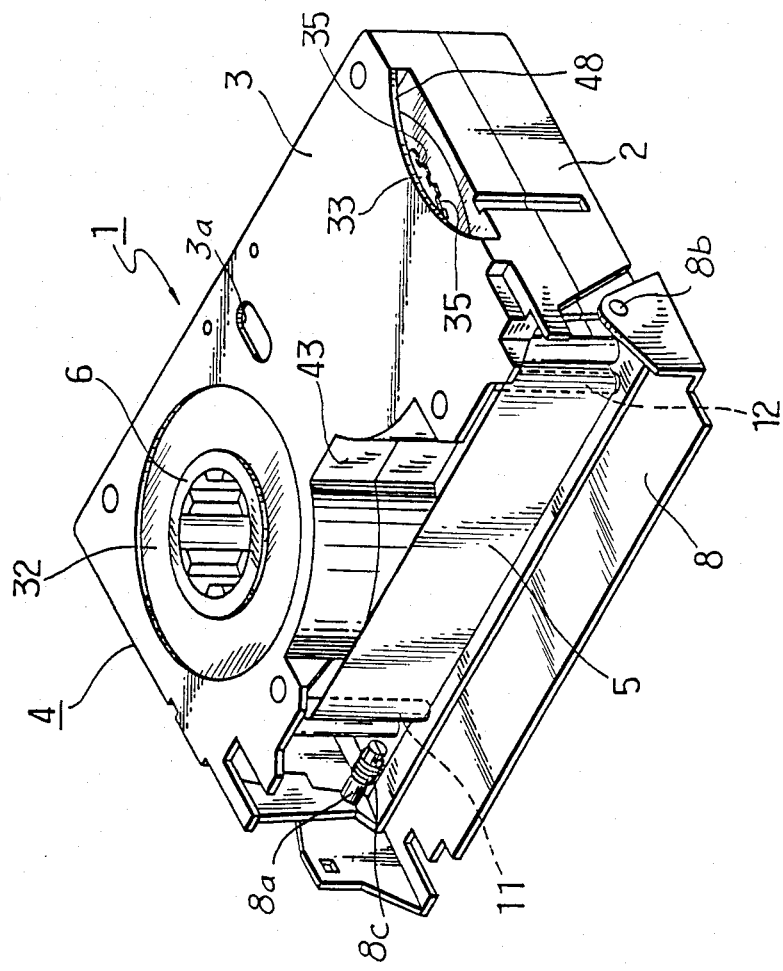
FIG. 5 is a perspective view, viewed from the bottom, of the compact cassette of FIG. 1 having the lid in an open position.

Along the front edge of casing 4 a lid 8 is normally spring-biased in a closed position to protect and retain magnetic tape 5 within casing 4. As shown in FIGS. 2, 3 and 5, lid 8 is pivotally mounted to upper shell half 2 by pivot pins 8a and 8b, and a spring 8c is wrapped about pin 8a for normally biasing lid 8 to a closed position. Further, an arm 36 is pivotally secured to a pin 37 and includes two projections 38 and 39 which are normally biased to outwardly project from a side of casing 4. Lid 8 has an opening 40 through which projection 38 protrudes when the lid is in its closed position and which effectively locks lid 8 in this position. Arm 36, and hence, projections 38 and 39, are normally spring-biased in an outwardly extending direction by a spring 42 mounted in casing 4 about pin 37, spring 37 including an extension which abuts against and biases a projection 41 mounted on arm 36. Upon insertion of cassette 1 into a cassette adapter 52 according to this invention, projection 39 is pressed inwardly against the force of spring 42, thereby also forcing projection 38 into casing 4 against the force of spring 42, and hence, out of opening 40, thereby releasing lid 8 which can then be biased into an open position.

Figure 3:
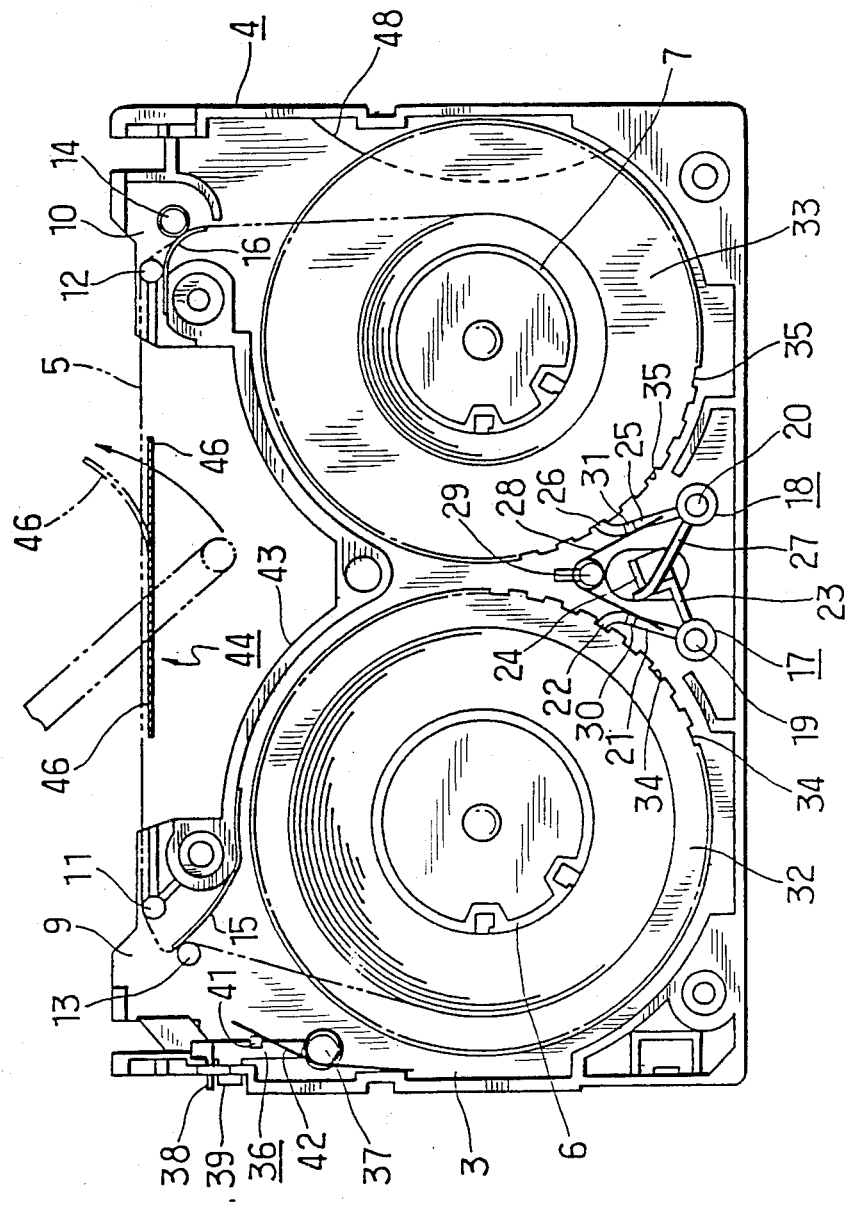
FIG. 3 is a top plan view, with portions cut away, of the compact cassette of FIG. 1.

As shown in FIG. 3, lock devices 17 and 18 are positioned in the lower shell half 3 between S reel 6 and T reel 7 and each includes a hub pivotally connected about pins 19 and 20, respectively, mounted in lower shell half 3. Reel lock device 17 has a first arm 21 secured to its respective hub and which terminates in a pawl 22 for engaging with gear teeth 34 positioned along the outer periphery of lower flange 32 of S reel 6. A second arm 23 projects from the hub of reel lock device 17 and terminates in a projection 24 which is positioned in opposing relation to an opening 3a in lower half shell 3, whereby upon insertion of cassette 1 into a cassette adapter 52, a lock release pin (not shown) is inserted through the opening into engagement with projection 24 to rotate reel lock device 17 about pin 19. At such time, it is to be appreciated that pawl 22 is rotated out of engagement with gear teeth 34 to permit free rotation of S reel 6. Likewise, reel lock device 18 is similarly configured with a first arm 25 terminating in a pawl 26 for engagement with gear teeth 35 positioned along the outer periphery of lower flange 33 of T reel 7, and a second arm 27 which engages with projection 24 in such a manner as to also rotate reel lock device 18 about pin 20 upon actuation of projection 24. At such time, pawl 26 is rotated out of engagement with gear teeth 35 to permit free rotation of T reel 7. Reel lock devices 17 and 18 are normally spring-biased by a spring 28 positioned about a stationary pin 29. In this regard, spring 28 biases projections 30 and 31 provided on arms 21 and 25 of reel lock devices 17 and 18 to normally bias pawls 22 and 26 into engagement with gear teeth 34 and 35, respectively. In operation, pawls 22 and 26 matingly engage with gear teeth 34 and 35, respectively, to effectively prevent any rotation of the S and T reels prior to loading of the cassette into the adapter 52. Upon the loading thereof, projection 24 is engaged by the lock release pin to pivot reel lock devices 17 and 18 about pins 19 and 20, respectively, against the force of spring 28, so that pawls 22 and 26 are caused to disengage from the plurality of gear teeth 34 and 35, and thereby allowing rotation of the S and T reels.

Figure 6:
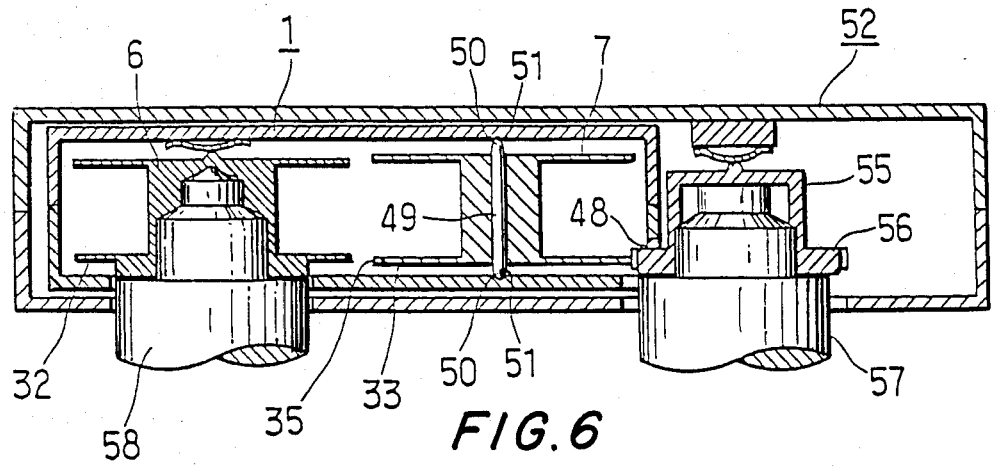
FIG. 6 is a cross-sectional view of a cassette adapter having a compact cassette positioned therein according to one embodiment of the present invention.

In accordance with a first aspect of this invention, as shown in FIGS. 4-6, lower shell half 3 is further provided with an opening 48 in which the lower flange 33 of T reel 7 extends, having gear teeth 35 positioned along the outer periphery thereof. T reel 7 is rotatably mounted about a fixed or stationary axis of rotation about a shaft 49, having conically shaped tips 50 which are rotatably positioned within V-shaped grooves 51 formed in the upper and lower half shells.

As shown in FIGS. 6 and 7, a cassette adapter 52 which permits the compact cassette of this invention to be used with a conventional size VTR, has an outer configuration which includes a lid 53, through which compact cassette 1 is loaded, and a front opening 54 through which the magnetic tape of the cassette can be withdrawn. During the loading operation, lid 53 of the adapter is opened and cassette 1 is lowered into cassette adapter 52 with projection 39 being forced inwardly by the inner configuration of the adapter, thereby permitting the opening of lid 8 of cassette 1 by other means (not shown). Subsequently, means for withdrawing magnetic tape 5 from cassette 1, typically an arm, as shown in phantom in FIG. 3, which is positioned in and connected to the cassette adapter, swings upwardly from beneath magnetic tape 5 to thread the magnetic tape through opening 54. Further, as described above, at such time, a lock release pin (not shown) engages projection 24, thereby releasing the S and T reels for rotational movement. Cassette 1 is then in a position for the subsequent winding and unwinding of magnetic tape 5.

In accordance with a first embodiment of the present invention, as shown in FIG. 6, upon loading compact cassette 1 into adapter 52, a gear 55 thereof having a plurality of gear teeth 56 along the periphery thereof, is brought into mating engagement with gear teeth 35 of lower flange 33 of T reel 7 through opening 48 in casing 4. Gear 55 is, in turn, engaged by a take-up reel drive shaft 57 of the VTR so that rotation thereof causes T reel 7 to unwind or wind the tape as desired. It is to be appreciated that, with this arrangement, there is no play in the movement of T reel 7 so as to avoid the problems previously discussed. S reel 6, on the other hand, is positioned in such a manner as to be slightly displaceable in the transverse direction relative to a drive shaft 58 to provide for ease of engagement therewith.

Figure 9:
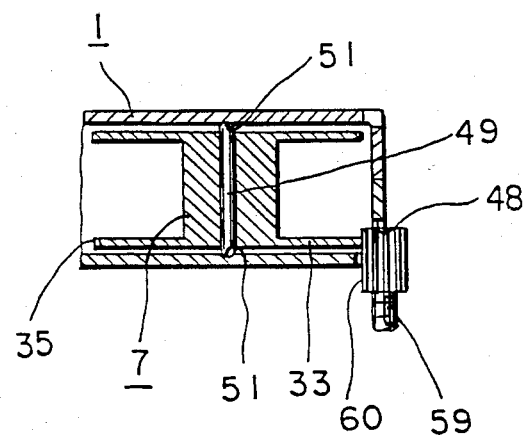
FIG. 9 is a cross-sectional view of a portion of a compact cassette and cassette adapter according to another embodiment of the present invention, showing the take-up reel of the cassette and a gear drive of the cassette adapter in direct engagement therewith.

In a second embodiment of the present invention as shown in FIG. 9, T reel 7 is driven directly by a gear 60 of the VTR mounted at the upper end of a rotatable drive shaft 59, such that gear 60 directly engages gear teeth 35 positioned in opening 48. This direct engagement between gear teeth 35 on lower flange 33 and gear 60 provides a maximum amount of energy efficiency by decreasing the number of gears which must be incorporated into the adapter design. Further, by minimizing the number of driving gears between drive shaft 59 and gear teeth 35, friction and wear between the gears will be kept to a minimum, thereby increasing the life span of the cassette and cassette adapter.

Figure 10:
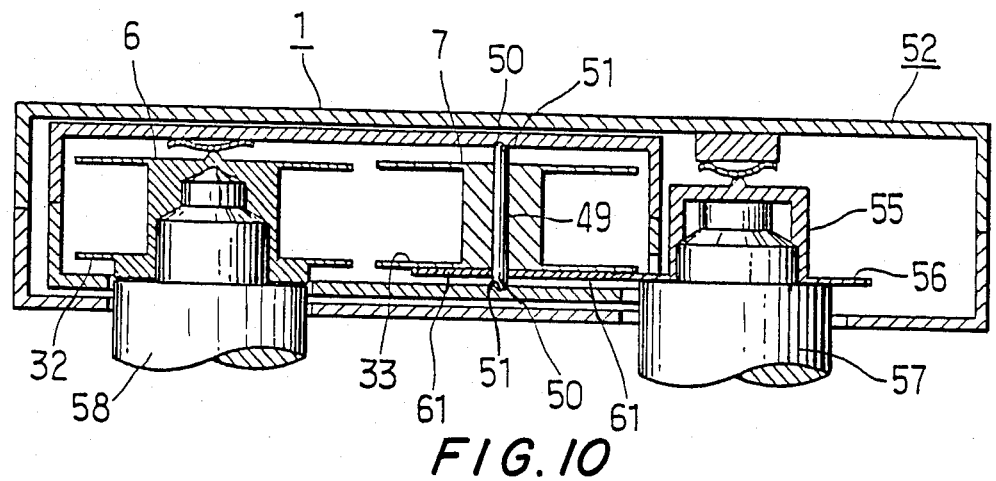
FIG. 10 is a cross-sectional view of a cassette adapter having a compact cassette positioned therein according to another embodiment of the present invention.
Figure 11:
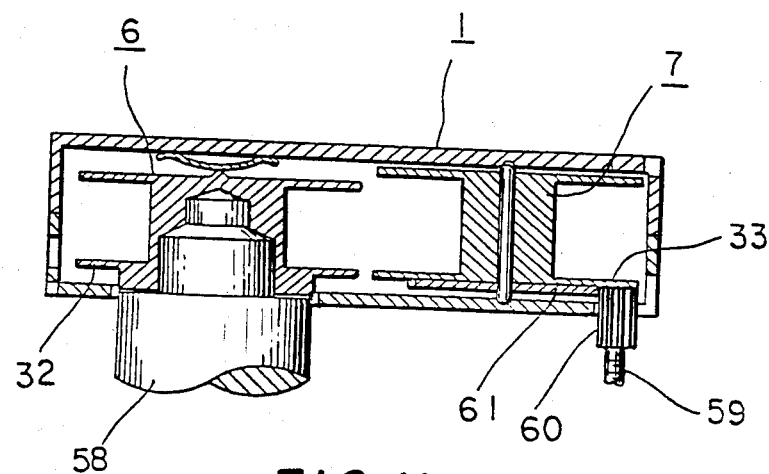
FIG. 11 is a cross-sectional view of a compact cassette and cassette adapter according to another embodiment of the present invention, showing the take-up reel of the compact cassette and a gear drive of the cassette adapter in direct engagement therewith.

Modifications of the embodiments shown in FIGS. 6 and 9 are shown in FIGS. 10 and 11, respectively, in which a gear 61 having gear teeth on the periphery thereof is positioned about shaft 49 adjacent to lower flange 33, that is, at the bottom face of lower flange 33 or spaced therefrom. Thus, in FIG. 10, gear 55 having gear teeth 56 extends through opening 48 into driving engagement with gear 61 and, in FIG. 11, gear 60 protrudes through opening 48 into driving engagement with gear 61. Once again, this latter configuration minimizes the number of drive gears required to rotate T reel 7.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

What is claimed is:

1. A tape cassette for use with an information signal recording and/or reproducing apparatus having reel driving means, said tape cassette comprsing:

housing means;

a supply reel rotatably positioned within said housing means;

a take-up reel rotatably positioned about a fixed axis of rotation within said housing means;

engaging means mounted within said housing means for rotation with said take-up reel and engageable by said reel driving means for rotatably driving said take-up reel;

lid means pivotally mounted to said housing means; and lid lock means for preventing pivotal movement of said lid means to an open position;

said lid means including a first aperture, said housing means including a second aperture in alignment with said first aperture when said lid means is in a closed position and a third aperture, and said lid lock means including an arm pivotally mounted within said housing means, a first projection, a second projection and spring means for biasing said arm so that said first projection extends through said third aperture and said second projection extends through said first and second apertures to lock said lid means in said closed position.

2. A tape cassette according to claim 1; in which said apparatus includes means for biasing said first and second projections out of the respective apertures against the force of said spring means.

* * * * *